(12) United States Patent
Pabijanskas et al.

(10) Patent No.: US 12,010,102 B1
(45) Date of Patent: Jun. 11, 2024

(54) HYBRID CRYPTOGRAPHY VIRTUAL PRIVATE NETWORKS

(71) Applicant: 360 IT, UAB, Vilnius (LT)

(72) Inventors: Karolis Pabijanskas, Vilnius (LT); Mantas Jonytis, Grigiskes (LT)

(73) Assignee: 360 IT, UAB, Vilnius (LT)

( * ) Notice: Subject to any disclaimer, the term of this patent is extended or adjusted under 35 U.S.C. 154(b) by 0 days.

(21) Appl. No.: 18/474,688

(22) Filed: Sep. 26, 2023

(51) Int. Cl.
*H04L 9/40* (2022.01)
*H04L 9/06* (2006.01)
*H04L 9/30* (2006.01)
*H04L 9/32* (2006.01)

(52) U.S. Cl.
CPC ........ *H04L 63/0272* (2013.01); *H04L 9/0618* (2013.01); *H04L 9/3073* (2013.01); *H04L 9/32* (2013.01); *H04L 63/029* (2013.01)

(58) Field of Classification Search
CPC ............... G06F 11/328; G06F 11/3447; G06F 11/3495; G06F 17/5045; G06F 9/45558; G06F 2009/45587; G06F 2009/45562; G06F 2009/4557; H04L 41/046; H04L 41/0686; H04L 41/22; H04L 63/0428; H04L 63/06; H04L 67/10; H04L 63/045; H04L 63/061; H04L 67/1097; H04L 63/0272; H04W 28/0231; H04W 28/20; H04W 4/70; H04W 88/08; H04W 88/10; H04W 72/0446
USPC ........ 713/155, 150, 163, 181; 726/2, 21, 36; 380/255, 264, 276
See application file for complete search history.

(56) References Cited

U.S. PATENT DOCUMENTS

| | | | | |
|---|---|---|---|---|
| 11,652,615 B1* | 5/2023 | Holmström | ........... | H04L 9/0825 713/171 |
| 11,729,148 B1* | 8/2023 | Pabijanskas | ........ | H04L 63/0272 726/15 |
| 11,818,027 B2* | 11/2023 | Mineikis | ............ | H04L 12/4641 |
| 2007/0016801 A1* | 1/2007 | Bade | ..................... | H04L 9/3234 713/193 |
| 2013/0173970 A1* | 7/2013 | Kleveland | .............. | G11C 29/50 714/710 |
| 2015/0019803 A1* | 1/2015 | Miller | .................. | G06F 3/0611 711/125 |
| 2016/0011801 A1* | 1/2016 | Goldberg | .............. | G06F 3/0655 711/114 |
| 2017/0090935 A1* | 3/2017 | Falsafi | ................ | G06F 12/0875 |
| 2020/0336464 A1* | 10/2020 | Hastings | ............... | H04L 9/0841 |
| 2022/0060899 A1* | 2/2022 | Harding | ............. | H04W 12/069 |
| 2023/0188510 A1* | 6/2023 | Kaciulis | .................... | H04L 9/40 713/168 |

* cited by examiner

Primary Examiner — Sharif E Ullah
(74) Attorney, Agent, or Firm — Young Basile Hanlon & MacFarlane, P.C.

(57) ABSTRACT

A virtual private network (VPN) client generates a short-term key pair. The VPN client generates a short-term high security key pair. The VPN client transmits a request for a pre-shared key (PSK) to a VPN server. The VPN client receives a response that includes the PSK. The VPN client decrypts the response based on the short-term key pair to obtain a ciphertext. The VPN client decrypts the ciphertext based on the short-term high security key pair to obtain the PSK. A VPN tunnel is then established between the VPN client and the VPN server based on the PSK.

20 Claims, 9 Drawing Sheets

HYBRID CRYPTOGRAPHY VIRTUAL PRIVATE NETWORKS

TECHNICAL FIELD

This disclosure relates to Virtual Private Networks (VPNs), and more specifically to the securing the exchange of pre-shared keys (PSKs).

BACKGROUND

PSKs can be used with VPNs to authenticate the two endpoints (i.e., the VPN client and the VPN server) of a VPN tunnel. A PSK is a shared cryptographic key that is known to both the VPN server and the VPN client (e.g., a user device). When the VPN client attempts to connect to the VPN server, the VPN client sends the PSK as part of an authentication process. The VPN server checks the received PSK against its own copy to verify the identity of the VPN client. PSKs are but one way to authenticate endpoints and other schemes are possible.

Once the VPN server verifies the PSK of the VPN client and successfully authenticates the VPN client, the VPN client and the VPN server negotiate session keys or encryption keys to establish a secure tunnel for data transmission. This process typically uses a key exchange protocol, such as Diffie-Hellman, to generate a shared secret that will be used for encryption and decryption transmitted over the tunnel during the VPN session using an agreed-upon cryptographic algorithm and the session key.

SUMMARY

An aspect of the disclosed implementations is a method that includes generating, by a virtual private network (VPN) client, a short-term key pair; generating, by the VPN client, a short-term high security key pair; transmitting, by the VPN client, a request for a pre-shared key (PSK) to a VPN server; receiving, by the VPN client, a response that includes the PSK; decrypting, by the VPN client, the response based on the short-term key pair to obtain a ciphertext; decrypting, by the VPN client, the ciphertext based on the short-term high security key pair to obtain the PSK; and establishing a VPN tunnel between the VPN client and the VPN server based on the PSK.

Another aspect of the disclosed implementations is a VPN client that includes a memory and a processor. The processor is configured to execute instructions stored in the memory to generate a short-term key pair; generate a short-term high security key pair; transmit a request for a pre-shared key (PSK) to a VPN server; receive a response that includes the PSK; decrypt the response based on the short-term key pair to obtain a ciphertext; decrypt the ciphertext based on the short-term high security key pair to obtain the PSK; and establish a VPN with the VPN server based on the PSK.

Another aspect of the disclosed implementations is a non-transitory computer readable medium storing instructions operable to cause one or more processors to perform operations that include generating, by a virtual private network (VPN) client, a short-term key pair that includes a short-term public key and a short-term private key; generating, by the VPN client, a short-term high security key pair that includes a short-term high security public key and a short-term high security private key; transmitting, by the VPN client, a request for a pre-shared key (PSK) to a VPN server; receiving, by the VPN client, a response that includes the PSK; decrypting, by the VPN client, the response using the short-term private key to obtain a ciphertext; decrypting, by the VPN client, the ciphertext using the short-term high security private key to obtain the PSK; and establishing a VPN tunnel between the VPN client and the VPN server based on the PSK.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
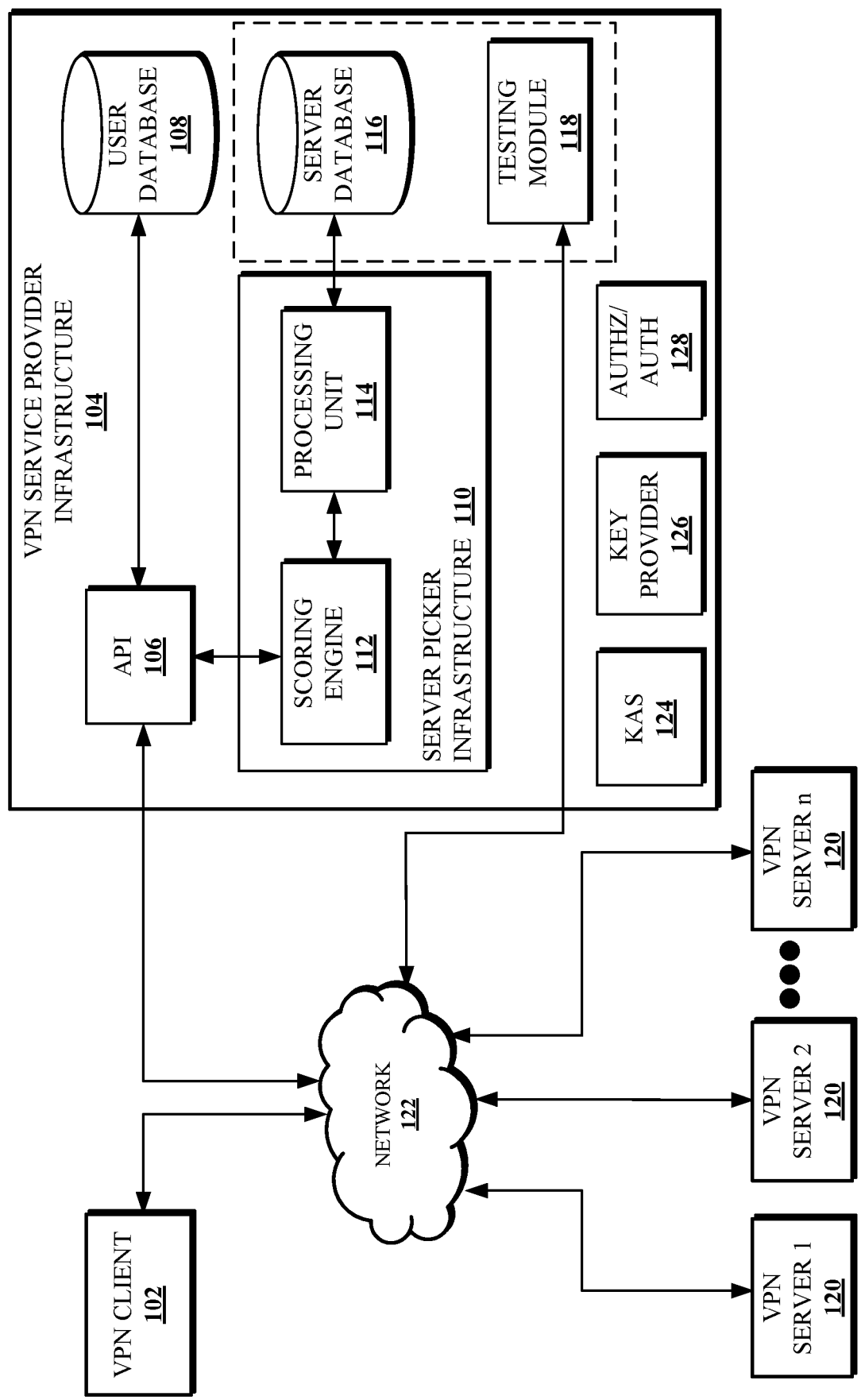
FIG. 1 shows a block diagram of an exemplary architectural depiction of components.

A key aspect of VPNs is cryptography, regardless of the type of VPN protocol that is used. A VPN protocol defines the rules and procedures for how data is encrypted and transmitted between a VPN client and a VPN server. Known VPN protocols include OpenVPN, Internet Protocol Security (IPSec), Layer 2 Tunneling Protocol with IPSec (L2TP/IPSec), Point-to-Point Tunneling Protocol (PPTP), Secure Socket Tunneling Protocol (SSTP), and WireGuard.

VPN communications face a critical challenge posed by emerging and advanced computer technologies and algorithms that are capable of performing complex calculations at an unprecedented speed, which could render current encryption methods vulnerable to attacks. Such technologies include quantum computing. For example, conventional encryption techniques and algorithms utilized in current VPN configurations may be susceptible to being compromised by the immense computational power of quantum computers, which could break the encryption through brute force attacks. Quantum computers have the potential to solve certain mathematical problems much faster than traditional classical computers, which could render many of the commonly used cryptographic algorithms insecure.

To address this vulnerability, the development of quantum-resistant encryption methods has become essential. Post-quantum cryptography (PQC), also known as quantum-resistant cryptography or quantum-safe cryptography, refers to cryptographic algorithms and protocols designed to withstand attacks from quantum computers. PQC aims to create new cryptographic techniques that are secure against attacks from both classical and quantum computers. These algorithms are based on different mathematical problems that are believed to be hard to break even for quantum computers. Examples of post-quantum cryptographic algorithms include lattice-based cryptography, code-based cryptography, multivariate polynomial cryptography, and hash-based cryptography, among others.

Kyber is another example of a PQC scheme (i.e., algorithm). Kyber is a portfolio of post-quantum cryptographic primitives built around a key encapsulation mechanism (KEM) that is designed to be resistant to attack by quantum computers. Kyber was one of the finalists in the U.S. National Institute of Standards and Technology (NIST) Post-Quantum Cryptography Standardization process. Kyber was ultimately selected as the standard for KEM.

By adopting post-quantum resistant algorithms, such as Kyber, sensitive data and communications can be safeguarded against the unprecedented computational power offered by quantum computers, therewith ensuring long-term security in the evolving landscape of information technology. Kyber has demonstrated its efficiency and low computational overhead, making it a promising solution for securing data against future quantum threats. Integrating quantum-resistant encryption schemes, like Kyber, into VPN protocols can significantly enhance the resilience of VPN communications against both classical and potential quantum attacks.

As already mentioned, and is known, a PSK is a secret key that is shared in advance between VPN endpoints for secure communication. The PSK configuration is applicable to various VPN protocols, including IPsec, L2TP/IPsec, and OpenVPN. The PSK configuration enhances security measures across all protocols by involving the exchange of a symmetric key between the endpoints prior to establishing a VPN connection. The symmetric key is then used to encrypt all traffic between the VPN endpoints.

However, even with the utilization of quantum-resistant encryption methods, the key exchange phase remains a vulnerable aspect of VPN tunnel establishment. While the underlying symmetric encryption may be quantum resistant, the key exchange process itself is susceptible to potential attacks.

Implementations according to this disclosure ensure the secure exchange of the PSK in such a way that is quantum resistant. Conventionally, PSKs may be exchanged out-of-band (e.g., such using an offline exchange) scheme that takes place prior to and independent of a request by a VPN client to establish a VPN tunnel with a VPN server. Some encryption algorithms, such as Kyber, can be incorporated or used in the PSK exchange process to provide substantial protection against potential quantum threats. Quantum-resistant encryption techniques and algorithms, such as the Kyber algorithm, seamlessly integrate into existing cryptography suites, ensuring a comprehensive and robust security framework without disrupting the established cryptographic protocols. It is noted that, while Kyber is mainly used in the description herein, the disclosure is not so limited and any PQC KEM can be used.

To describe some implementations in greater detail, reference is first made to examples of hardware and software structures used to implement hybrid cryptography VPNs. In FIG. 1, all occurrences of communication between a VPN client 102, VPN service provider infrastructure 104 and the plurality of VPN servers 120 occur through the network 122. The instances of communication between VPN client 102 and VPN service provider infrastructure 104 include but are not limited to authentication, authorization, data exchange, etc. The communication instances between VPN client 102 and the plurality of VPN server 120 can happen through an encrypted tunneling protocol provided by the VPN client application installed on the VPN client 102. The tunneling protocols can include but are not limited to PPTP, SSTP, L2TP/IPSec, OpenVPN, SSTP, IKEv2, SSL/TLS, WireGuard.

With reference to FIG. 1, the API 106 receives a request from the VPN client 102 via the network 122. The request can be for the internet protocol (IP) address of an optimal server in order to establish a VPN connection therewith. The VPN service provider infrastructure 104 (or one or more components therein) may be used to authenticate and authorize VPN clients, such as the VPN client 102. Credentials are provided by the VPN client 102 for the purpose of authentication, which may then be verified by the API 106 by accessing the user database 108. The API 106 queries the user database 108 for verifying the credentials provided by the VPN client 102 against the data present in the user database 108. Once the credentials are validated, the API 106 authenticates and authorizes the VPN client 102.

The VPN client 102 may request the API 106 for the IP address of an optimal server in order to establish a VPN connection. To satisfy the request, the API 106 in turn requests the server picker infrastructure 110 for an optimal server. The server picker infrastructure 110 is responsible for identifying the optimal server from the plurality of VPN server 120. Through a series of in-built methods and/or systems, the server picker infrastructure 110 is able to identify the optimal server. In particular, the server picker infrastructure 110 identifies an optimal server by calculating server penalty score for the plurality of VPN server 120. The server penalty score is based on multiple server conditions obtained through the testing module 118. The scoring engine 112 proceeds to calculate the server penalty score by using the numerical weights provided by the processing unit 114, and the random value for each of the plurality of VPN server 120 calculated by the scoring engine 112. The random value is a numerical value in the interval [0, 0.001]. Addition of this small value to the server penalty score calculation ensures that each score is different and avoids coincidences of server penalty score values.

The IP addresses of the plurality of VPN server 120 are arranged in an ascending order according to their respective server penalty score. The scoring engine 112 then identifies one or more optimal servers by choosing the servers with the lowest penalty scores. After which, the scoring engine 112 selects and may return one or more IP addresses of one or more identified optimal servers to the API 106. The VPN client 102 may receive the one or more IP addresses of the identified one or more optimal servers through the API 106, after which the VPN client 102 may make a secure connection with one of the optimal servers identified by the scoring engine 112. The scoring engine 112 and the processing unit 114 include respective internal storage unit or an internal memory capable of storing, arranging, and sequencing data.

The server database 116 and the user database 108 can be conventional databases offered by MySQL, MS SQL, NoSQL, object-oriented databases, or any other type or category of databases. Data storage-wise, the server database 116 can also be a data storage within the memory of a computing device or within a cloud. The server database 116 can be used for storing, organizing, and returning data related to the plurality of VPN server 120. Similarly, the user database 108 is responsible for storing, and returning authentication credentials of the VPN client 102 accessing the VPN service provider infrastructure 104. Information regarding the plurality of VPN server 120 are stored in the server database 116 for the purpose of penalty score calculation.

Requests from the VPN client 102 in the current embodiment may be executed through a VPN client application installed locally or remotely, launched locally or as a remote application. This VPN client application is a software-based technology that establishes a secure connection between the VPN client 102 and a VPN Server. The VPN client application can include a front-end interface that allows a user of the VPN client 102 to interact and configure it. In some cases, a VPN client application can be included in a stand-alone purpose-built device, or a standard computing or networking device installed and configured with the VPN client application software.

Further, in FIG. 1, the testing module 118 is responsible for collecting the information related to multiple server conditions including but not limited to geo-location of servers, IP addresses of servers, location of servers with respect to the international internet exchange hub, creation time of servers, load measurements of servers, etc. The testing module 118 can determine hub score for each server in the plurality of VPN server 120 based on their proximity to the international Internet exchange hub. Hub scores are assigned by the testing module 118 and indicate the proximity of a server to the international Internet exchange hub. Higher hub score indicates that a server is significantly far from an international Internet exchange hub and vice versa. Furthermore, testing module 118 is also able to monitor and measure the load of a particular server at regular time intervals and can update the load measurements in the server database 116. All the necessary information regarding the server conditions can be populated into the server database 116 by the testing module 118 which are then later utilized by the server picker infrastructure 110.

The plurality of VPN server 120 are constantly updated and rearranged within the suggested list of VPN server 120 according to their server penalty scores, with the lowest score value always at the top, enabling a dynamic and effective system and method to identify the optimal server from the list of scored VPN server 120.

Respective server penalty scores may be calculated for the plurality of VPN server 120. A server penalty score is an indicator of the suitability of a particular server for servicing the VPN client 102. First numerical weights for the plurality of VPN server 120 are computed based on their server conditions. Multiple server conditions of an individual server are represented numerically through the calculations of numerical weights. Using these numerical weights, the server penalty score for each server present in the plurality of VPN server 120 is determined and computed.

The server database 116 that may contain information related to several server conditions gathered by the testing module 118. The server database 116 and the testing module 118 can be either inbuilt or in combination with the current embodiment. The Testing Module present in FIG. 1 of the current embodiment is responsible to gather information relating to several server conditions of the plurality of VPN server 120.

It is noted that while the foregoing selects a VPN server that a VPN client is to connect to, the disclosure herein is not so limited. That is, the disclosure herein is not limited to or by any particular way of selecting a VPN server for a VPN client to connect to. For example, the VPN server that a VPN client is to connect to may be selected randomly.

The VPN service provider infrastructure 104 may further include a key acceptance service (KAS) 124, a key provider 126, or an authorization and authentication server (i.e., an authz/authn server 128).

In conjunction with the authz/authn server 128, the KAS 124 can be responsible (e.g., executes instructions) for authenticating and authorizing VPN clients, such as the VPN client 102, that transmit requests for establishing VPN tunnels with a VPN server. That is, The KAS 124 may proxy authorization and authentication requests to the authz/authn server 128. The KAS 124 can also generate and distribute shared secret keys (e.g., PSKs) that are used to encrypt data transmitted within VPN tunnels.

The key provider 126 can be a server, a system, a datastore, a component (e.g., software component), or any other type of computing resource that is suitable for managing (e.g., determining, storing, administrating) PSKs. The key provider 126 may also store encryption and decryption keys. To illustrate, and without limitations, the key provider 126 can be a Key Management System (KMS) or a Secure Key Storage Database (such as an encrypted relational or NoSQL database). The key provider 126 may store, maintain, or otherwise have access to PSKs associated with VPN clients, such as the VPN client 102.

The authz/authn server 128 verifies the identity of VPN clients or end-users associated with the VPN clients connecting to VPN servers, while ensuring that only authorized users or VPN devices access a VPN network. The authz/authn server 128 validates credentials (e.g., such as usernames, passwords, certificates, or etc.) during connection attempts. Upon authentication, the authz/authn server 128 may determine access levels and resources based on roles, responsibilities, and security policies, specifying network parts, actions, and data permissions.

Figure 2:
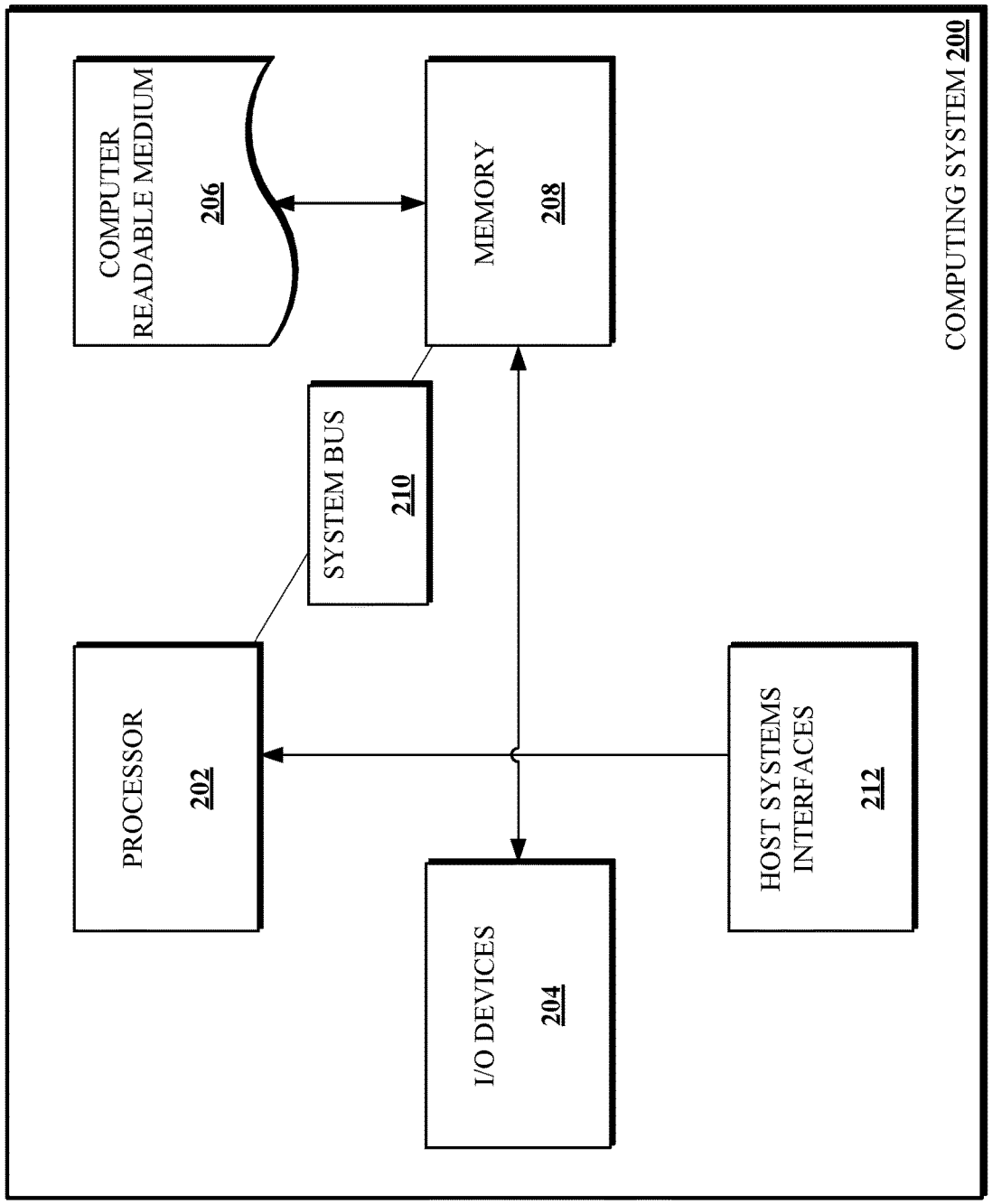
FIG. 2 is a block diagram of an example internal configuration of a computing device.

FIG. 2 is a block diagram of an example internal configuration of a computing device 200. The computing device 200 includes a computer readable medium 206 that may include instruction for performing, in part or in whole, any techniques and processes disclosed herein. In one configuration, the computing device 200 may implement one or more of the VPN client 102 of FIG. 1, a VPN server 120, such as one of the VPN servers 1 to N, as shown in FIG. 1, or one or more computing devices capable of performing any functionality described with respect to the VPN service provider infrastructure 104 shown in FIG. 1.

Furthermore, some aspects of the embodiments herein can take the form of a computer program product accessible from the computer readable medium 206 to provide program code for use by or in connection with a computer or any instruction execution system. For the purposes of this description, the computer readable medium 206 can be any apparatus that can tangibly store the program code for use by or in connection with the instruction execution system, apparatus, or device, including the computing device 200.

The computer readable medium 206 can be any tangible electronic, magnetic, optical, electromagnetic, infrared, or semiconductor system (or apparatus or device). Some examples of a computer readable medium 206 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing device 200 can include one or more processors 202 coupled directly or indirectly to memory 208 through a system bus 210. The memory 208 can include local memory employed during actual execution of the program code, bulk storage, and/or cache memories, which provide temporary storage of at least some of the program code in order to reduce the number of times the code is retrieved from bulk storage during execution.

Input/output (I/O) devices 204 (including but not limited to keyboards, displays, pointing devices, I/O interfaces, etc.) can be coupled to the computing device 200 either directly or through intervening I/O controllers. Network adapters may also be coupled to the computing device 200 to enable the computing device 200 to couple to other data processing systems, such as through host systems interfaces 212, printers, and/or storage devices through intervening private or public networks. Modems, cable modems, and Ethernet cards are just examples of network adapter types.

Figure 3:
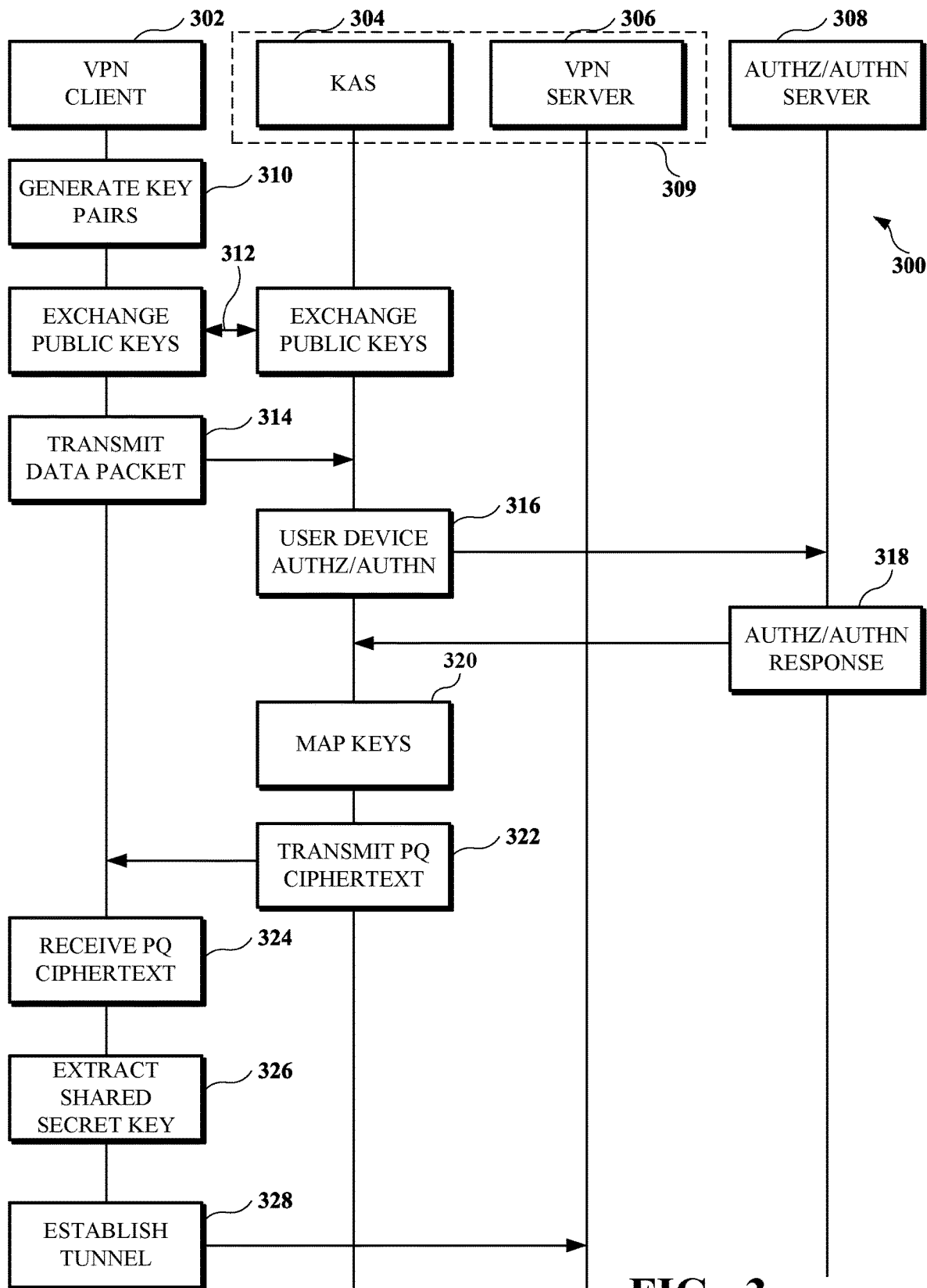
FIG. 3 is an example of an interaction diagram for transmitting a PSK to a VPN client, using a secure channel, before the PSK is used.

FIG. 3 is an example of an interaction diagram 300 for transmitting a PSK to a VPN client, using a secure channel, before the PSK is used. The interaction diagram 300 includes a VPN client 302 (which can be the VPN client 102 of FIG. 1), a KAS 304, a VPN server 306 (which can be one of the VPN servers 120 of FIG. 1), and an authz/authn server 308 (which can be the authz/authn server 128 of FIG. 1). The interaction diagram 300 can be said to describe a process for synchronizing of the PSK between the VPN client 302 and the VPN server 306 prior to establishing a VPN tunnel therebetween.

The KAS 304 can performs functions or provide services similar to those described with respect to KAS 124 of FIG. 1. In an example, the KAS 304 can be included in or can be a part of the VPN server 306, as illustrated by a box 309. In another example, the KAS 304 can be separate from the VPN server 306. For example, the KAS 304 may be a server that is included in the VPN service provider infrastructure 104 of FIG. 1. That is, the KAS 304 can be the KAS 124 of FIG. 1. In either case, the KAS 304 is shown as being separate from the VPN server 306 to better illustrate the separation of duties or functionalities.

As further described below, keys are exchanged in at least two places of the interaction diagram 300: at 312 and then as part of tunnel establishment at 328. In the case that the VPN server 306 and the KAS 304 are on the same (physical or virtual) machine, they may be referred to together as "VPN target server" or simply as a "VPN server." As such, the VPN server 306 and the KAS 304 can both have the same key pairs. In another scenario, where the VPN server 306 and the KAS 304 are on separate machines, they could have the same or and different keys.

While not specifically shown in FIG. 3, the process described with respect to the interaction diagram 300 can be initiated in response to the VPN client 302 transmitting a request to establish a VPN tunnel with the VPN server 306. In an example, the VPN client 302 may obtain an IP address of the VPN server 306 as described with respect to FIG. 1.

At 310, the VPN client 302 generates two pairs of keys. Both sets of keys are considered short-term, which means that they are used for a limited period and purpose and are not used to encrypt data transmitted over the VPN tunnel to be established, at 328, between the VPN client 302 and the VPN server 306.

The first pair of keys (referred to herein as a short-term x25519 key pair) can be a pair of cryptographic keys used in the x25519 key exchange algorithm, which is an elliptic curve Diffie-Hellman (ECDH) algorithm that provides a secure method for two parties to establish a shared secret key over an insecure channel. Thus, in this case, the short-term key pair can be referred to as a Curve25519 key pair. The x25519 key pair includes a private key (short-term private x25519 key) and a public key (short-term public x25519 key). The short-term private x25519 key is a randomly generated secret that is kept confidential at the VPN client 302. The short-term public x25519 key is derived from the private key using a mathematical function and is shared with the KAS 304, as described below. The short-term public x25519 key is used to perform the key exchange.

It is noted that while the description herein illustratively uses x25519 key pairs. The disclosure is not so limited and other key pairs, such as Rivest-Shamir-Adleman (RSA), Digital Signature Algorithm (DSA), Elliptic Curve Digital Signature Algorithm (ECDA), Diffie-Hellman (DH), or other key pairs can be used.

The second pair of keys (referred to herein as a short-term Kyber key pair or, more broadly, as short-term high-security key pair or as quantum-resistant key pair) can be generated using Kyber-512, Kyber-768, or any other Kyber key sizes. As is known, the "512" and "768" represent two different security levels or parameter sets available in the Kyber algorithm. Kyber-512 offers a lower security level, while Kyber-768 provides a higher security level. Kyber-512 provides security roughly equivalent to Advanced Encryption Standard (AES)-128; and Kyber-768 provides security roughly equivalent to AES-192. Similar to the short-term x25519 key pair, the short-term Kyber key pair includes a short-term public Kyber key and a short-term private Kyber key. To reiterate, while Kyber is mainly used to facilitate understanding, the disclosure is not so limited and any PQC KEM can be used.

At 312, the VPN client 302 and the KAS 304 perform a handshake process. In this handshake process, respective public keys of the VPN client 302 and the KAS 304 are exchanged. These respective public keys are traded (e.g., exchanged) and verified for authenticity and are different from the short-term key generated at 310. Thus, the public keys exchanged during the handshake process are referred to herein as long-lived keys. Thus, during the handshake process the VPN client 302 and the KAS 304 exchange their respective long-term public keys. As such, the VPN client 302 transmits, and the KAS 304 accepts, the long-term public x25519 key of the VPN client 302; and the KAS 304 transmits, and the VPN client 302 accepts, the long-term public x25519 key associated with the VPN server 306. The KAS 304 holds, or has access to, the long-term public x25519 key associated with the VPN server 306. Similarly, the VPN client 302 holds or has access to its public key. The long-term keys can be used for authentication. To illustrate, the VPN client 302 transmits its long-term public key as proof of its identity. As such, the long-term key pair can be used as an alternative to other credentials (such as a username/password combination) that the VPN client 302 may transmit during the handshake process.

At 314, the VPN client 302 constructs and transmits a request packet to the KAS 304. The request packet can be one or more packets. The VPN client 302 includes the short-term public x25519 key and the short-term public Kyber key of the VPN client 302 in the request packet. The request packet may be encapsulated within a data packet. The request packet essentially is or includes a request to receive the PSK. As further described below, prior to the KAS 304 transmitting back the PSK at 322, the VPN client 302 is authenticated (steps 316-318). If the VPN client 302 is not authenticated, then the KAS 304 does not transmit a PSK back.

Prior to sending any keys to the VPN client 302, the VPN client 302 is authenticated. Authenticating the VPN client 302 is carried out via the KAS 304 to ensure security. That is, the VPN client 302 does not directly communicate to the authz/authn server 308. As mentioned, the KAS 304 can proxy authorization and authentication requests to the authz/authn server 308, as needed.

As such, at 316, the KAS 304 transmits a request to the authz/authn server 308 requesting authentication and authorization of the VPN client 302. The authz/authn server 308 verifies that the VPN client 302 is authorized to establish a VPN tunnel with the VPN server 306. Authentication and authorization ensure that only legitimate and authorized VPN clients can access the VPN services. At 318, the authz/authn server 308 transmits a response to the request. The response can indicate whether the VPN client 302 is authorized or not. If the response indicates that the VPN client 302 is not authorized, then the interaction diagram 300 terminates. However, FIG. 3 illustrates the case where the VPN client 302 is authorized. In another implementation, VPN client 302 authentication can take place earlier in the process, such as during, or prior to, performing the handshake process at 312.

In an example, the KAS 304 transmits its digital certificate to the VPN client 302 during the handshake process. This certificate can include the long-term public key associated with the KAS 304, and other identifying information. The certificate is signed by a trusted third-party entity, a Certificate Authority (CA). The VPN client 302 checks the validity of the certificate by verifying the digital signature on the certificate using a public key associated with the CA. The KAS 304 performs a similar process with respect to the VPN client 302.

At 320, the KAS 304 maps the long-term public x25519 key received from the VPN client 302 during the handshake process at 312 to the short-term public x25519 key included in the request packet transmitted, at 314, by the VPN client 302. As there cannot be two VPN clients with the same PSK where one of them having already shared the PSK with the KAS 304 (such as at 312), this step constitutes a re-verification of the long-term public x25519 key. This mapping is necessary to prevent multiple VPN clients with the same public keys from using the same pre-shared key. The rationale for this mapping is now further described.

As a consequence of the 312 and 316 steps, the VPN client 302 ends up being associated with two public x25519 keys: the long-term and the short-term public x25519 keys. The long-term public x25519 key, which is transmitted, at 312, by the VPN client 302 is the key that the authz/authn server 308 was already aware of and is authenticating in 316-318. Again, this first public key is long-lived and the authz/authn server 308 includes or has access to a copy of this public key. This long-lived public x25519 key of the VPN client 302 is mapped to the short-term public x25519 key provided in 312 for authenticating the user.

Initially, the VPN client 302 starts out without having a PSK mapped to its long-lived public x25519 key. If the PSK were to be assigned to this long-lived public x25519 key of the VPN client 302, then the communication channel may immediately break (e.g., disconnect), depending on the protocol. For example, WireGuard does not permit a VPN client to be associated with two configurations (on the VPN server side) where one configuration is with a PSK and the other is without a PSK. As such, when the PSK request is sent at 314, in addition to the Kyber key, the short-lived public x25519 key, which is unknown to the authz/authn server 308, is also transmitted by the VPN client 302. Thus, at 320, the KAS 304 maps the long-lived public x25519 key of the VPN client 302 to the short-lived public x25519 key of the VPN client 302, with which the PSK will be associated. As such, the PSK and the short-lived public x25519 key of the VPN client 302 need not be stored, such as in the authz/authn server 308. To summarize, the key mapping at 320 is necessary because there cannot be two peers with the same public keys with only one of them having a PSK.

While not explicitly shown in FIG. 3, this mapping can be used during and subsequent to tunnel establishment at 328. For example, the authz/authn server 308 may be used to track (e.g., statuses of) VPN sessions. The KAS 304 may transmit VPN session status updates to the authz/authn server 308. The KAS 304 transmits VPN session status updates based on the long-term public keys of VPN clients. By maintaining mappings from short-term public x25519 keys to long-term public keys of VPN clients (such as the VPN client 302), while VPN sessions are established based on short-term keys from the perspective of the KAS 304, the authz/authn server 308 need not be aware of short term keys being used. As such, the short-term public keys of VPN clients (such as the VPN client 302) are transparent to the authz/authn server 308 and are fully handled on the VPN server 306 during tunnel establishment.

At 322, the KAS 304 generates a ciphertext and transmits the ciphertext to the VPN client 302. The ciphertext is encapsulated and transmitted in response to the request for the PSK transmitted by the VPN client 302, at 314. The ciphertext may be a Kyber ciphertext. That is, the KAS 304 generates a Kyber ciphertext using the short-term public Kyber key of the VPN client 302 and then encrypts the ciphertext using the short-term public x25519 key of the VPN client 302. The KAS 304 encrypts the public Kyber key of the VPN server 306 using the public x25519 key of the VPN client 302. The ciphertext is then transmitted to the VPN client 302. To reiterate, while Kyber is mainly used to facilitate understanding, the disclosure is not so limited and any PQC KEM can be used.

To restate, the KAS 304 generates a shared secret (i.e., the PSK) to be used as a shared secret for a symmetric cryptographic algorithm to be used to encrypt/decrypt data transmitted over a VPN tunnel. The KAS 304 generates a Kyber ciphertext that includes the shared secret. The KAS 304 then encapsulates (e.g., encrypts) the shared secret (i.e., the ciphertext) using the received short-term public x25519 key of the VPN client 302. As such, the KAS 304 transmits the ciphertext (e.g., the encrypted ciphertext) to the VPN client 302.

At 324, the VPN client 302 receives the ciphertext in response to the request transmitted at 314. At 326, the VPN client 302 decapsulates the response and extracts the shared secret (i.e., the PSK) therefrom. The VPN client 302 uses its short-term private x25519 key to decrypt the ciphertext and uses its short-term private Kyber key to extract the PSK. At 328, the VPN tunnel is created. The PSK is used for establishing the initial connection and for generating encryption keys during the VPN tunnel setup. That is, the shared secret key is used by the VPN client 302 as a pre-shared key to establish the secure VPN tunnel to the VPN server 306.

Figure 4:
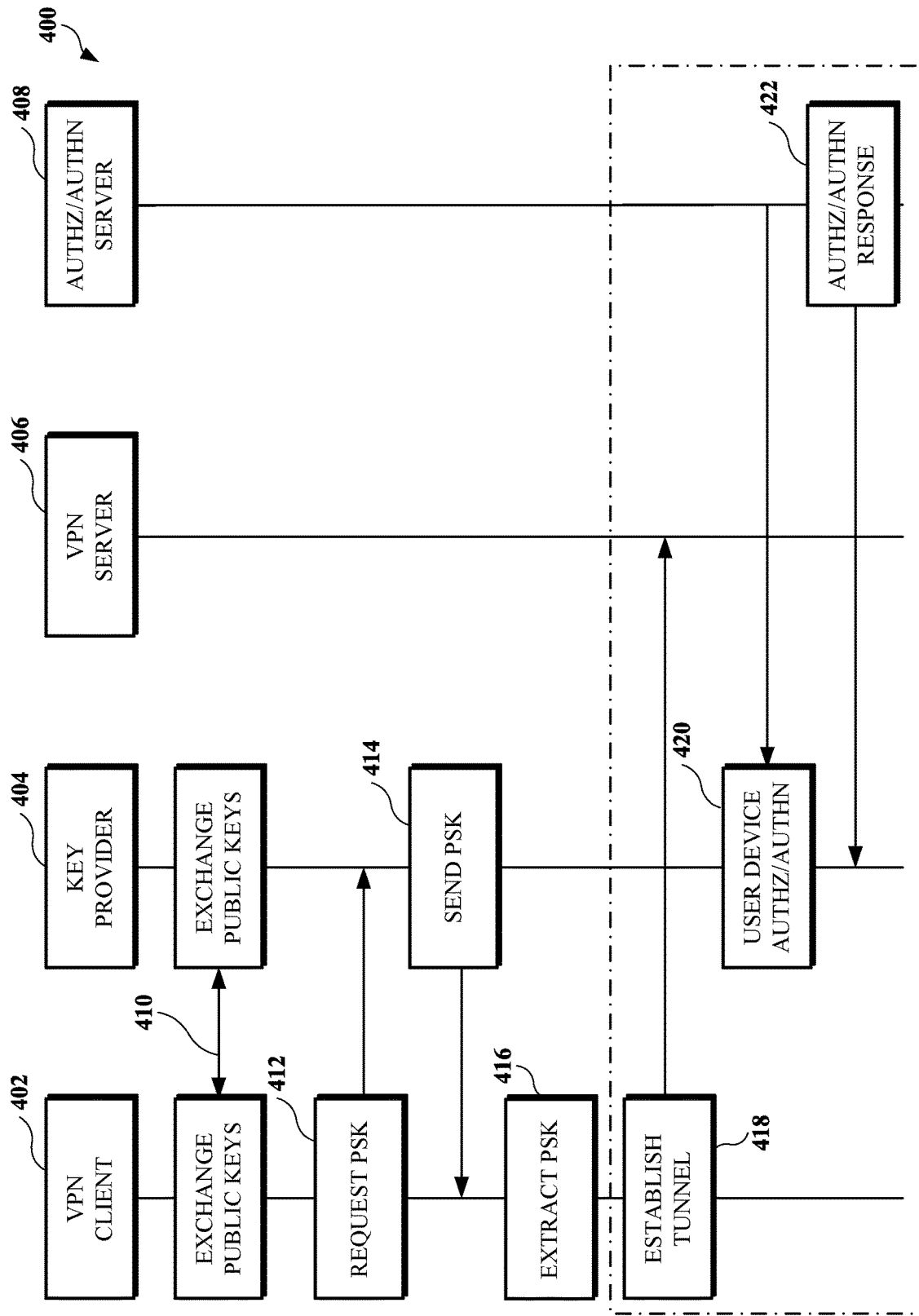
FIG. 4 is an example of an interaction diagram for receiving a PSK at a VPN client.

FIG. 4 is an example of an interaction diagram 400 for receiving a PSK at a VPN client. The interaction diagram 400 includes a VPN client 402 (which can be the VPN client 102 of FIG. 1), a key provider 404, a VPN server 406 (which can be one of the VPN servers 120 of FIG. 1), and an authz/authn server 408 (which can be the authz/authn server 128 of FIG. 1). The key provider 404 is distinguished from the KAS 304 of FIG. 3 since it is separate from the VPN server 406. The key provider 404 can be or can provide functions and services described with respect to the key provider 126 of FIG. 1. The interaction diagram 400 describes a process where the VPN client 402 securely obtains the PSK from the key provider 404 prior to establishing a VPN tunnel with the VPN server 406. The interaction diagram 400 is characterized in that a respective PSK is pre-generated and stored in a database per authorized entity. The entity can be a user or can be a device that is associated with a user. An authorized entity means that the entity is configured to use the VPN services, such as those provided or enabled by a VPN infrastructure, such as the VPN service provider infrastructure 104 of FIG. 1. The authz/authn server 408 can be as described with respect to the authz/authn server 128 of FIG. 1.

At 410, the VPN client 402 and the key provider 404 perform a handshake process whereby their respective public keys are exchanged. The public keys exchanged can be x25519 keys. However, as described above, other types of public keys are possible. The exchanged public keys are used at 416 when establishing a VPN tunnel between the VPN client 402 and the VPN server 406.

At 412, the VPN client 402 transmits a request for the PSK to the key provider 404. The VPN client 402 transmits the request via a quantum-resistant channel. That is, data transmitted over the communication channel between the VPN client 402 and the key provider 404 can be encrypted using a PQC algorithm. In an example, Kyber is used. As such, the VPN client 402 may use Kyber encryption to encrypt the request. In the process of establishing the quantum-resistant channel, the VPN client 402 and the key provider 404 may exchange their respective public Kyber keys. In an example, the VPN client 402 and the key provider 404 may generate respective Kyber key pairs in the process of establishing the quantum-resistant channel.

In an example, requesting the PSK at 412 can be as described with respect to or similar to 314 of FIG. 3. That is, the request for the PSK can include a short-term public x25519 key and a short-term public Kyber key, which the key provider 404 can use, at 414, to transmit the PSK back to the VPN client 402. In an example, the request can only include the short-term public Kyber key, which the key provider may use at 414 to generate a ciphertext. The ciphertext may be transmitted back as is or may be further encrypted using a long-term public key associated with the VPN client 402. The ciphertext can be an encrypted PSK. The ciphertext may be generated in any number of ways. For example, the ciphertext can be generated using any key for which the VPN client 402 has or can obtain the corresponding decryption key. To illustrate, the ciphertext of the PSK can be generated using the short-term public Kyber key of the VPN client 402; or using the long-term public key of the VPN client 402. The VPN client 402, when it receives the PSK, performs the appropriate reverse steps, whichever are applicable based on the implementations described herein.

At 414, the key provider 404 responds to the request by sending the PSK to the VPN client 402. The PSK may be encapsulated as described above. In an example, the response may be (e.g., include a payload that is) encrypted using the public Kyber key of the VPN client 402. While not specifically shown in FIG. 4, the key provider 404 identifies the PSK based on the VPN client 402. In an example, the key provider 404 retrieves the PSK from a data store (e.g., a database) based on the VPN client 402 or based on a user of the VPN client 402. In another example, the key provider 404 can generate the PSK when the request for the PSK is received and the necessary information (e.g., short-term public keys and/or long-term public keys) for the generation of the PSK is provided (e.g., received). The PSK may be associated with a property (e.g., metadata) of the VPN client 402. The property can be a Media Access Control (MAC) address of the VPN client 402, the public key of the VPN client 402, which is received at 410, or some other uniquely identifying property of the VPN client 402. The PSK may be associated with a property of the user of the VPN client 402. The property can be credentials of the user (e.g., a username and a password), a unique token assigned to the user, a digital certificate associated with the user, or some uniquely identifying property of the user.

At 416, the VPN client 402 extracts the PSK from the response. In an example, the VPN client 402 uses its private Kyber key to extract the PSK from the response. In another example, the VPN client 402 may first use a private key (a short-term private key or a long-term private key, as the case may be) to decrypt a ciphertext included in the response. The VPN client 402 can then use its private Kyber key to obtain the PSK from the ciphertext.

At 418, the VPN client 402 transmits a request to the VPN server 406 to establish a VPN tunnel. The process of establishing the VPN tunnel includes that the VPN server 406, at 420, authenticates and authorizes the VPN client 402 via the authz/authn server 408. At 422, the authz/authn server 408 transmits a response as to whether the VPN client 402 is authorized to establish the VPN tunnel. The authz/authn server 408 also verifies the identity of the VPN client 402. The PSK is used for establishing the initial connection and for generating encryption keys during the VPN tunnel setup. In the process of establishing the VPN tunnel, the VPN server 406 may obtain from, or the key provider 404 may make available or transmit to the VPN server 406, the PSK generated transmitted, at 414, to the VPN client 402.

Figure 5:
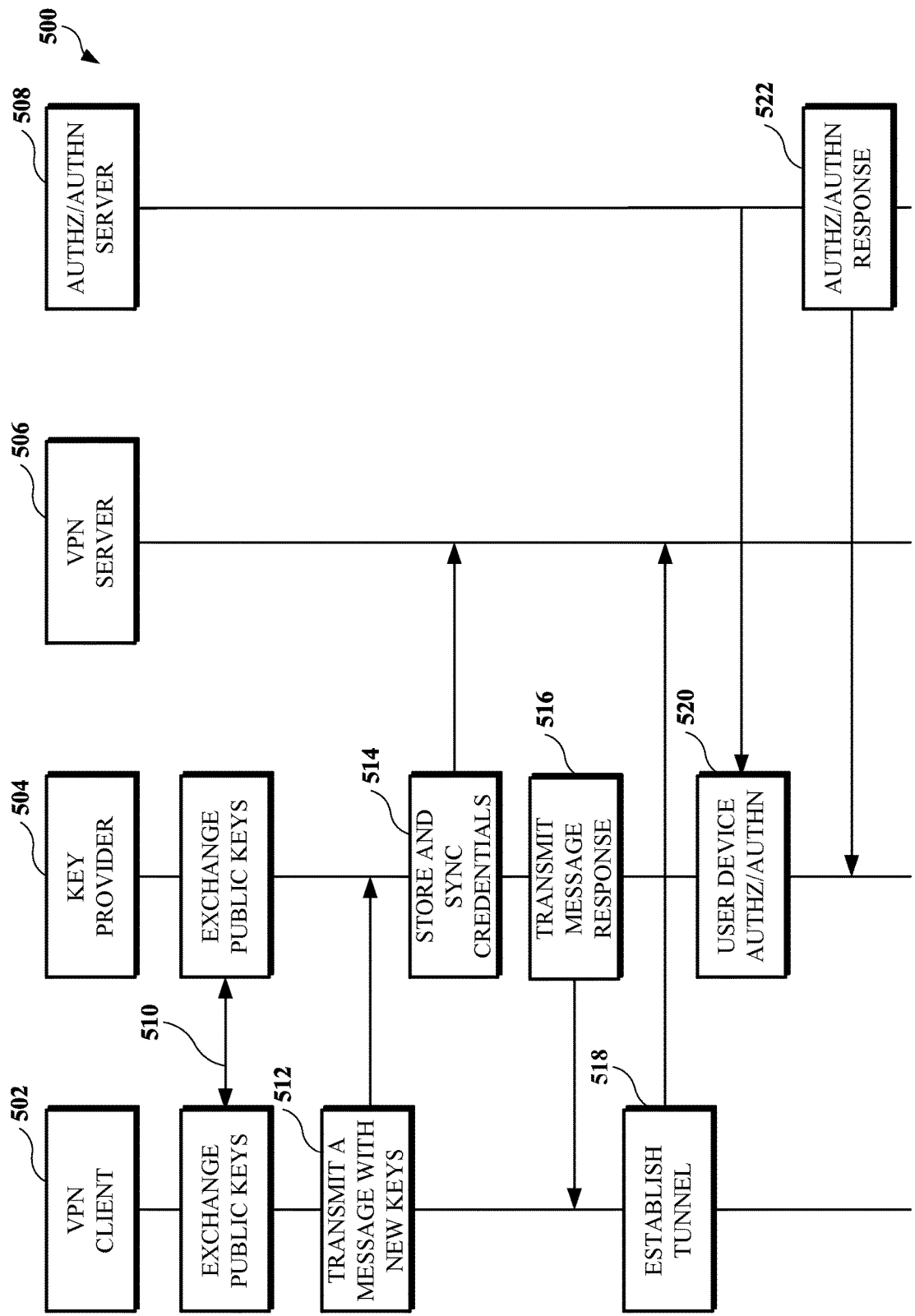
FIG. 5 is an example of an interaction diagram for using per-session PSKs.

FIG. 5 is an example of an interaction diagram 500 for using per-session PSKs. The interaction diagram 500 includes a VPN client 502 (which can be the VPN client 102 of FIG. 1), a key provider 504 (which can be similar to the key provider 126 of FIG. 1), a VPN server 506 (which can be one of the VPN servers 120 of FIG. 1), and an authz/authn server 508 (which can be the authz/authn server 128 of FIG. 1). The interaction diagram 500 describes a process where the PSK used in a VPN session is generated for the VPN session. That is, the interaction diagram 500 is characterized in that PSKs are generated per session.

At 510, the VPN client 502 and the key provider 504 perform a handshake process whereby their respective long-term public (e.g., x25519) keys are exchanged. The long-term public keys can be exchanged over a quantum-resistant channel, which can be established as described with respect to 410 of FIG. 4. The long-term public keys are used at 518 when establishing a VPN tunnel. The long-term public keys may be used for public-private authentication and a PSK can provide an additional security layer.

At 512, the VPN client 502 transmits a message to the key provider 504 to store a generated PSK (i.e., the PSK generated by the VPN client 502). While not specifically shown in FIG. 5 for brevity, the VPN client 502 generates a new key pair (i.e., a short-term x25519 key pair, a short-term Kyber key pair, or both) and the PSK. The new key pair (i.e., the short-term x25519 key pair, a short-term Kyber key pair, or both) is different from the long-term public key pair of the VPN client 502. The new key pair is used to encrypt the message that is to be transmitted and that includes the generated PSK. That is, the new key pair can be used to generate a ciphertext of the PSK. The PSK can be a random sequence of letters and numbers, which may be 8 to 63 characters long or of other numbers of characters. The PSK can be a short-term or the long-term public associated with or generated by the VPN client 502. It is noted that the VPN client 502 generates the new key pair to encrypt this message because otherwise the VPN server 506 will not be able to handle the connection, as described above. As mentioned, it may not be possible to have the same public key with and without a PSK. As such, only the new, short-term key pair is associated with the PSK. In another example, instead of generating the new key pair, the VPN client 502 may obtain the key pair from key provider 504.

At 514, the key provider 504 transmits the credentials of the VPN client 502 to the VPN server 506 as well as the received PSK. The credentials can be or include the public key of the VPN client 502. More broadly, the key provider 504 may transmit any uniquely identifying property (e.g., metadata) of the VPN client 502 or that of a user thereof, as described above. At 516, the key provider 504 transmits a response to the VPN client 502.

In the foregoing description, the VPN client 502 generates the PSK and transmits the PSK to the key provider 504. In other implementations, the message transmitted at 512 may essentially indicate or be a request for a PSK. As such, the key provider 504 can generate and store the PSK and can transmit a response to the VPN client 502 where the response includes the PSK that the key provider 504 generates in response to the message from the VPN client 502.

At 518-522, which can be as described with respect to 416-420 of FIG. 4, respectively, a VPN tunnel is established between the VPN client 502 and the VPN server 506 using (e.g. based on) the PSK. To establish the session keys for the VPN tunnel, the VPN server 506 retrieves and uses the PSK transmitted to it at 514. In the process of establishing the tunnel, the VPN client 518 transmits credentials to the VPN server 506, which the VPN server 506 uses to retrieve the associated PSK.

While not specifically shown, the VPN server 506 may transmit an authorization request to the key provider 504 so that the key provider 504 can perform the authentication and authorization of the VPN client 502 on behalf of the VPN server 506. The key provider 504 transmits an authorization and authentication request to the authz/authn server 508. That the key provider 504 receives the authorization request and performs the authentication and authorization can more broadly include that the VPN service provider infrastructure 104, which may be or include the key provider 504, receives the authorization request and performs the authentication and authorization on behalf of the VPN server 506. The key provider 504 may be more suitable for authorizing and authenticating the VPN client 502 since the key provider has obtained the public key of the VPN client 502 during the handshake process, at 510.

Figure 6:
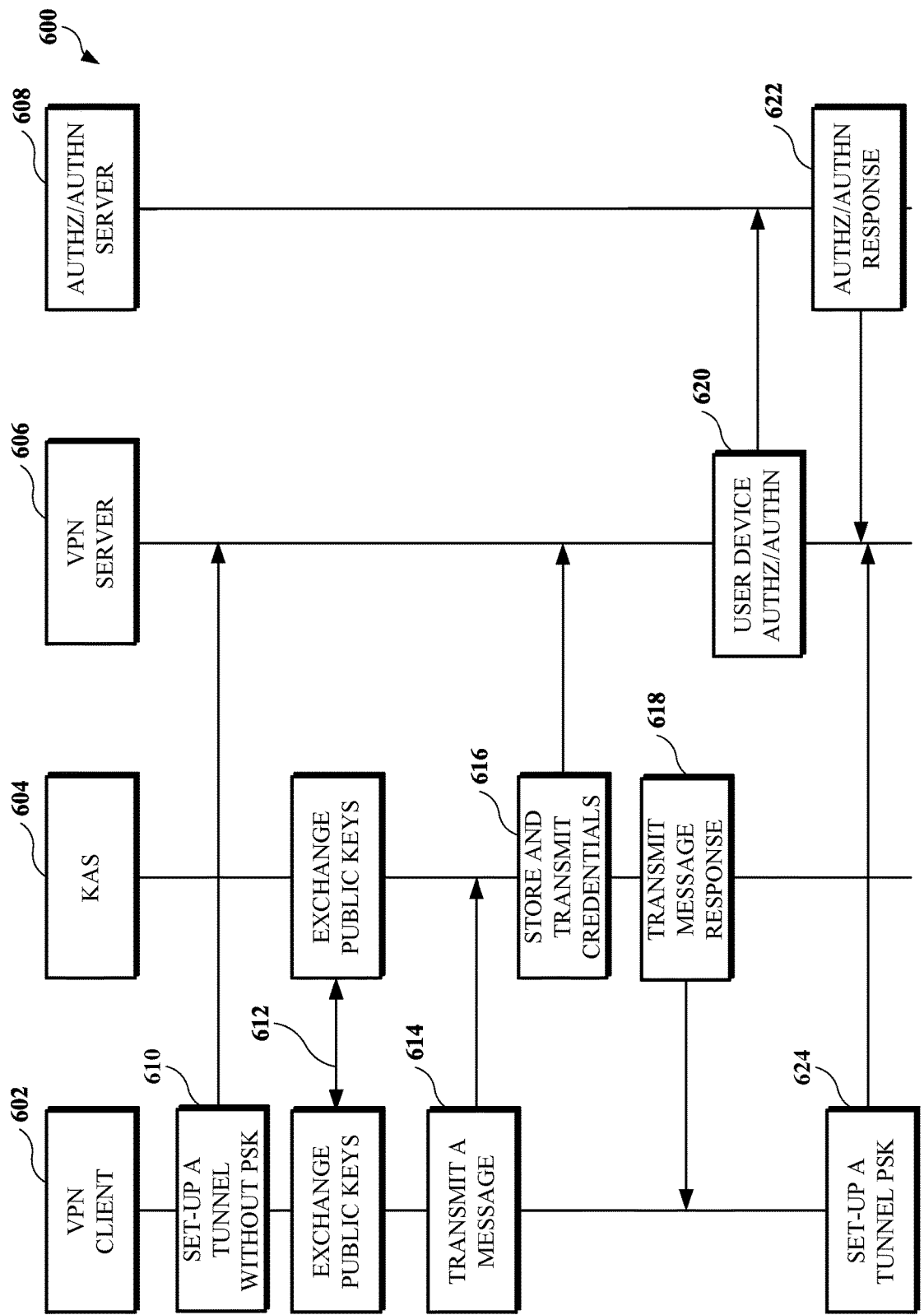
FIG. 6 is an example of an interaction diagram for upgrading a VPN connection.

FIG. 6 is an example of an interaction diagram 600 for upgrading a VPN connection. The interaction diagram 600 includes a VPN client 602 (which can be the VPN client 102 of FIG. 1), a KAS 604 (which can be as described with respect to KAS 304 of FIG. 3), a VPN server 606 (which can be one of the VPN servers 120 of FIG. 1), and an authz/authn server 608 (which can be the authz/authn server 128 of FIG. 1). The interaction diagram 600 describes a process where a connection is upgraded while synchronizing a PSK inside a non-quantum-resistant VPN tunnel.

In the interaction diagram 600, a first VPN tunnel is established for the purpose of transmitting a PSK. After the PSK is transmitted, a new (second) VPN tunnel is established using the PSK. The "upgrade" aspect of the VPN connection can be summarized as follows: A non-quantum-resistant VPN tunnel (i.e., a tunnel established without a PSK) is first established; a short-term Kyber keys exchange is performed to produce a PSK; and then the VPN client 602 reconnects to the VPN server 606 with the PSK (i.e., via a VPN tunnel that is established based on the PSK). This sequence essentially converts (e.g., upgrades) the connection from a non-quantum-resistant connection to a quantum-resistant connection.

At 610, the VPN client 602 establishes a VPN tunnel with the VPN server 606 where the VPN tunnel is established without using a PSK. The PSK exchange takes place inside this VPN tunnel. The VPN tunnel can be established using a protocol-related key pair. For example, if WireGuard is the protocol used with the VPN tunnel, then the key pair can be a WireGuard key pair. Then, inside of this VPN tunnel, another tunnel (i.e., a quantum resistant tunnel) is established for transmitting the PSK. In other implementations, the VPN client 602 can reuse the connection information (i.e., protocol-related key pair) of the initially established VPN tunnel (e.g., the first VPN tunnel), and uses the PSK to establish a new (second) VPN tunnel. In other implementations, the VPN client 602 may close the initially established VPN tunnel (e.g., the first VPN tunnel) and requests for a new connection information (e.g., VPN server data, protocol related-key pair) from the KAS to establish a new (second) VPN connection to the VPN server 606. As such, by connecting the VPN client 602 to the VPN server 606 via a VPN tunnel ensures that the VPN client 602 is communicating with the correct machine (e.g., server) and the server can be assumed to be authenticated.

At 612, which can be similar to 312 of FIG. 3, the VPN client 602 and the KAS 604 perform a handshake process whereby the respective public (e.g., x25519) keys are exchanged. The public keys are used to establish a VPN tunnel. A quantum-resistant channel is established inside this VPN tunnel.

At 614, which can be similar to 314 of FIG. 3, the VPN client 602 transmits a message to the KAS 604 to store a generated PSK (i.e., generated by the VPN client 602) over the quantum-resistant channel. That is, and while not specifically shown in FIG. 6, the VPN client 602 can generate and send a new key pair and the PSK to the KAS 604 via the previously established VPN tunnel (i.e., the tunnel established at 610). At 616, the KAS 604 transmits (e.g., syncs/sends/shares) credentials of the VPN client 602 with the VPN server 606 via the previously established VPN tunnel.

At 618, the KAS 604 transmits one or more responses (e.g., a confirmation or acknowledgement and a ciphertext) to the VPN client 602. While not specifically shown in FIG. 6, at this point, the first tunnel can be closed (e.g., terminated).

In the foregoing description, the VPN client 602 generates the PSK and transmits the PSK to the KAS 604. In other implementations, the message transmitted at 614 may essentially indicate or be a request for a PSK. As such, the KAS 604 can generate and store the PSK and can transmit a response to the VPN client 602 where the response includes the PSK that the KAS 604 generates in response to the message from the VPN client 602.

At 620, the VPN server 606 authenticates and authorizes the VPN client 602 via the authz/authn server 608. At 622, the authz/authn server 608 transmits a response back that indicates whether the VPN client is authorized or not. At 624, the VPN client 602 establishes a quantum-resistant VPN tunnel with the VPN server 606 while using the recently exchanged PSK. Authorization/authentication of the VPN client 602 and tunnel establishment can occur simultaneously.

To summarize, a VPN tunnel is first established without a PSK (e.g., a non-quantum-resistant VPN tunnel); the VPN tunnel is then upgraded to a quantum-resistant one (e.g., a VPN tunnel with a PSK).

Figure 7:
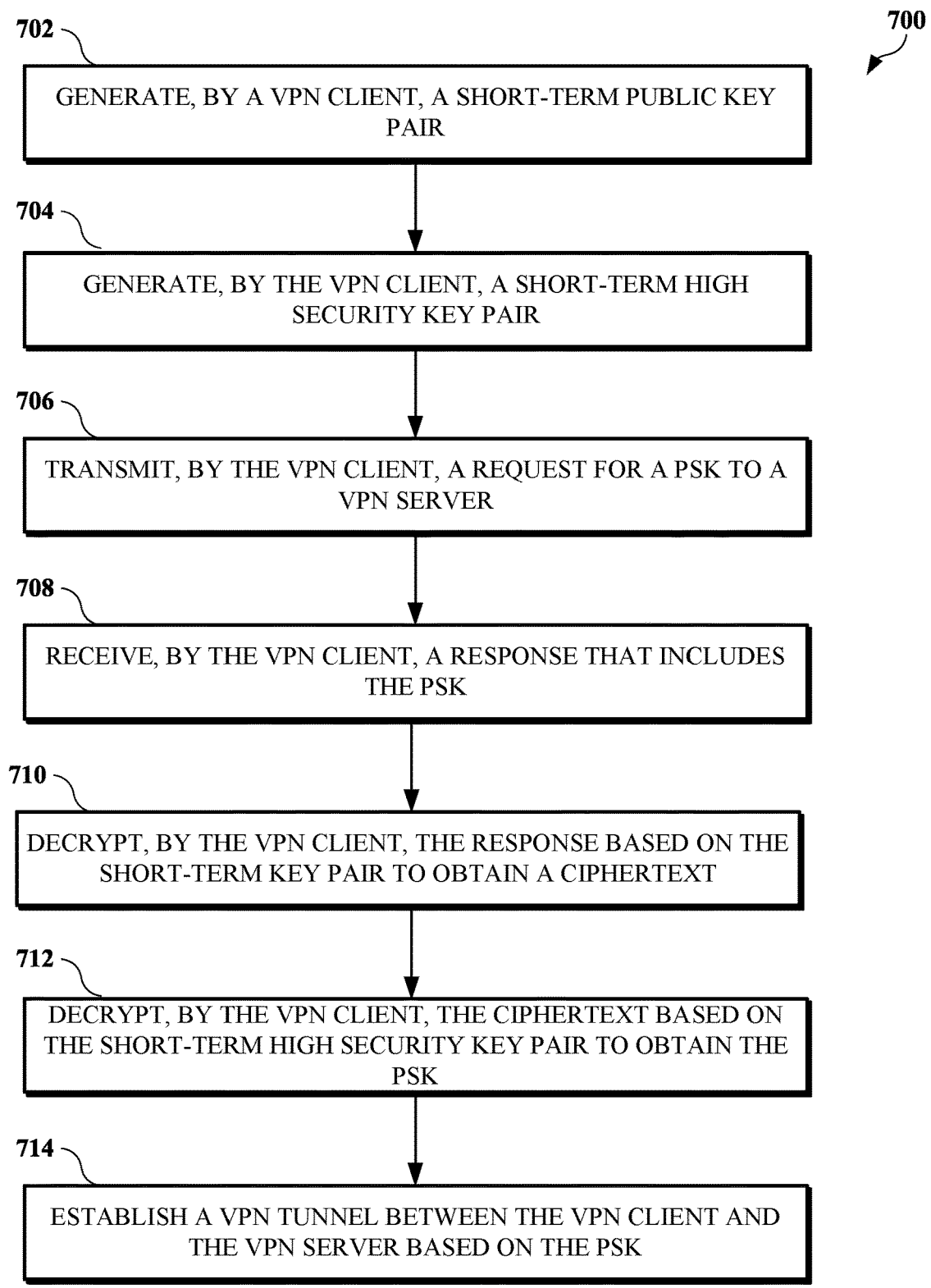
FIG. 7 is a flowchart of an example of a technique for obtaining a PSK prior to establishing a VPN tunnel.

To further describe some implementations in greater detail, reference is next made to examples of techniques which may be performed for secure PSK exchange. FIG. 7 is a flowchart of an example of a technique 700 for obtaining a PSK prior to establishing a VPN tunnel. The technique 700 can be executed using computing devices, such as the systems, hardware, and software described with respect to FIGS. 1-6. The technique 700 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 208 of FIG. 2. The steps, or operations, of the technique 700 or another technique, method, process, or algorithm described in connection with the implementations disclosed herein can be implemented directly in hardware, firmware, software executed by hardware, circuitry, or a combination thereof. The technique 700 may be implemented in whole or in part by a VPN client, such as the VPN client 302 of FIG. 3.

At 702, a short-term public key pair is generated at the VPN client. The short-term public key pair may include a short-term public key and a short-term private key. The short-term key pair can be generated using elliptic-curve cryptography. The short-term public key pair can be a Curve25519 key pair. At 704, a short-term high security key pair is generated at the VPN client. The short-term high security key pair can include a short-term high security public key and a short-term high security private key. A high-security channel denotes a communication pathway or protocol integrating cryptographic methods explicitly developed to resist potential attacks, both from quantum computers and from conventional computers equipped with capabilities to compromise present-day encryption algorithms. The short-term high security key pair can be quantum-resistant. The short-term high security key pair can be generated using a Kyber algorithm.

At 706, a request for a shared secret to a VPN server is transmitted by the VPN client to a VPN server. More specifically, and in an example, the request for the shared secret can be transmitted to key acceptance service that is included in or is a part of the VPN server. The request can include the short-term public key and the short-term high security public key.

At 708, a response that includes a shared secret is received at the VPN client. At 710, the VPN client decrypts the response based on the short-term key pair to obtain a ciphertext. For example, the VPN client may decrypt the response using the short-term private key to obtain the ciphertext. The ciphertext may be generated, by the VPN server (e.g., the KAS therein) using the short-term high security public key. At 712, the VPN client decrypts the ciphertext based on the short-term high security key pair to obtain the PSK. For example, the VPN client may decrypt the ciphertext using the short-term high security private key to obtain the PSK.

At 714, the VPN client establishes a VPN tunnel with the VPN server based on the shared secret such that the shared secret is used as a pre-shared key. In an example, the VPN client transmits, during a handshake operation with the VPN server, a long-term public key associated with the VPN client. The long-term public key can be used to authenticate the VPN client and/or to establish the VPN tunnel.

Figure 8:
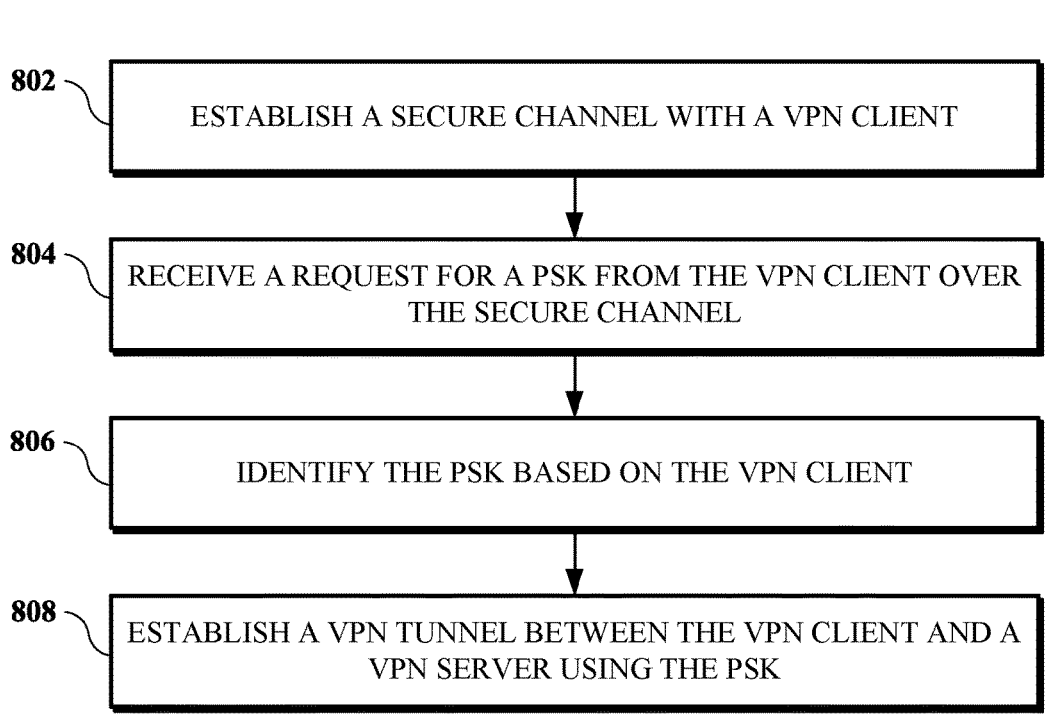
FIG. 8 is a flowchart of another example of a technique for obtaining a PSK prior to establishing a VPN tunnel.

FIG. 8 is a flowchart of another example of a technique 800 for obtaining a PSK prior to establishing a VPN tunnel. The technique 800 can be executed using computing devices, such as the systems, hardware, and software described with respect to FIGS. 1-6. The technique 800 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 208 of FIG. 2. The steps, or operations, of the technique 800 can be implemented directly in hardware, firmware, software executed by hardware, circuitry, or a combination thereof. The technique 800 may be implemented in part by a VPN key provider, which may be the key provider 404 of FIG. 4.

At 802, a secure channel is established with a VPN client. The secure channel is established between the VPN client and the key provider. The secure channel can be quantum-resistant. The secure channel can use a Kyber algorithm.

At 804, a request for a PSK is received from the VPN client over the secure channel. At 806, the PSK is identified based on the VPN client. In an example, identifying the PSK based on the VPN client includes retrieving the PSK from a data store based on a property associated with the VPN client. In an example, identifying the PSK based on the VPN client includes retrieving the PSK from a data store based on a property associated with a user of the VPN client. The PSK is accessible to the VPN server.

At 808, a VPN tunnel is established between the VPN client and a VPN server based on the PSK. For example, the PSK is used to generate encryption keys usable to encrypt and decrypt data transmitted over the VPN tunnel.

Figure 9:
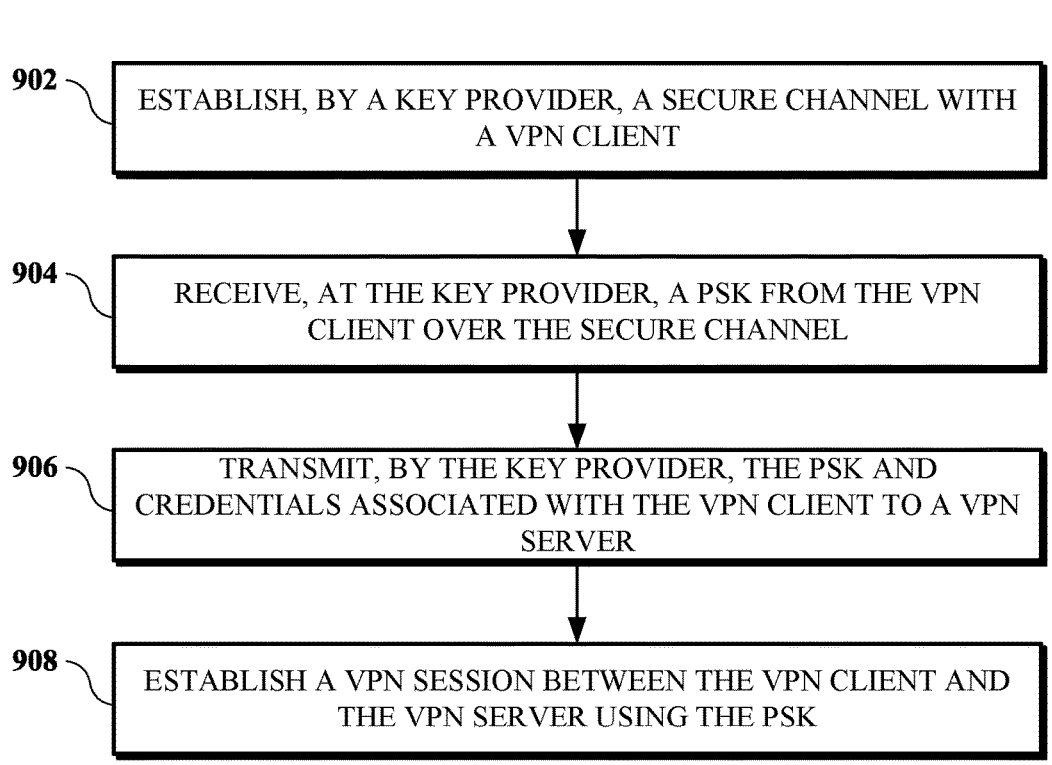
FIG. 9 is a flowchart of another example of a technique for obtaining a PSK prior to establishing a VPN tunnel.

FIG. 9 is a flowchart of another example of a technique 900 for obtaining a PSK prior to establishing a VPN tunnel. The technique 900 can be executed using computing devices, such as the systems, hardware, and software described with respect to FIGS. 1-6. The technique 900 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 208 of FIG. 2. The steps, or operations, of the technique 900 can be implemented directly in hardware, firmware, software executed by hardware, circuitry, or a combination thereof. The technique 900 may be implemented in part by a VPN key provider, which may be the key provider 504 of FIG. 5.

FIG. 9 is a flowchart of another example of a technique 900 for obtaining a PSK prior to establishing a VPN tunnel. The technique 900 can be executed using computing devices, such as the systems, hardware, and software described with respect to FIGS. 1-6. The technique 900 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 208 of FIG. 2. The steps, or operations, of the technique 900 can be implemented directly in hardware, firmware, software executed by hardware, circuitry, or a combination thereof. The technique 900 may be implemented in part by a VPN key provider, which may be the key provider 504 of FIG. 5.

At 902, the key provider establishes a secure channel with a VPN client. The secure channel can be quantum-resistant.

As described with respect to FIG. 5, the key provider and the VPN client exchange respective public keys and the key provider is different from the VPN server. The secure channel can use a Kyber algorithm. At 904, the key provider receives a PSK from the VPN client over the secure channel. The PSK can be randomly generated by the VPN client specifically for the VPN session.

At 906, the key provider transmits the PSK and credentials associated with the VPN client to a VPN server. At 908, a VPN session is established between the VPN client and the VPN server based on the PSK. For example, the PSK can be used to generate encryption keys usable to encrypt and decrypt data transmitted during the VPN session. In an example, the technique 900 can include performing, by the key provider, authentication and authorization of the VPN client.

Figure 10:
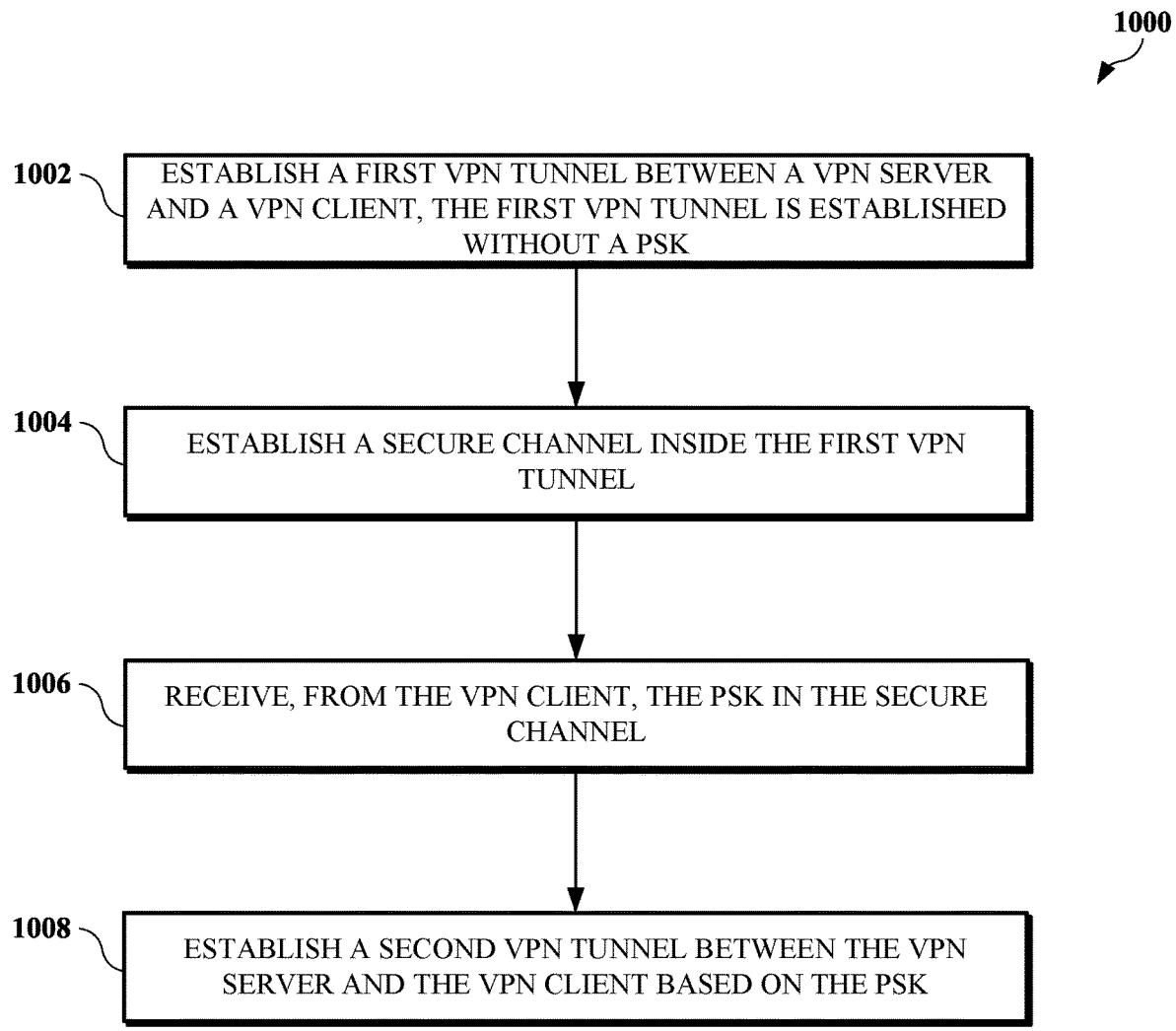
FIG. 10 is a flowchart of another example of a technique for obtaining a PSK prior to establishing a VPN tunnel.

FIG. 10 is a flowchart of another example of a technique 1000 for obtaining a PSK prior to establishing a VPN tunnel. The technique 1000 can be executed using computing devices, such as the systems, hardware, and software described with respect to FIGS. 1-6. The technique 1000 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 208 of FIG. 2. The steps, or operations, of the technique 1000 can be implemented directly in hardware, firmware, software executed by hardware, circuitry, or a combination thereof. The technique 1000 may be implemented in part by a KAS of a VPN server, which may be the KAS 604 of FIG. 6.

At 1002, the KAS establishes a first VPN tunnel between the VPN server and a VPN client. The first VPN tunnel is such that it is established without a PSK. At 1004, a secure channel is established inside the first VPN tunnel. The secure channel can be quantum-resistant.

The secure channel can use a Kyber algorithm.

At 1006, the KAS receives the PSK within the secure channel from the VPN client. At 1008, a second VPN tunnel is established between the VPN server and the VPN client based on the PSK. For example, the PSK can be used to generate encryption keys usable to encrypt and decrypt data transmitted over the second VPN tunnel.

The first VPN tunnel can be terminated after the PSK is received. In an example, authentication and authorization of the VPN client and establishing the second VPN tunnel can occur simultaneously.

Unless expressly stated, or otherwise clear from context, the terminology "computer," and variations or wordforms thereof, such as "computing device," "computing machine," "computing and communications device," and "computing unit," indicates a "computing device," such as the computing device 200 of FIG. 2, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data, such as one or more protocol data units, in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "establish" and "instantiate," and variations or wordforms thereof, indicates an allocation of memory, processing resources, or a combination thereof, wherein the allocation of memory may include the storage of data in the allocated memory, and wherein the allocation of processing resources may include the allocation, operation, or both, of one or more threads, handles, processing cores, or a combination thereof.

Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    generating, by a virtual private network (VPN) client, a short-term key pair;
    generating, by the VPN client, a short-term high security key pair, wherein the short-term high security key pair is quantum-resistant;
    transmitting, by the VPN client, a request for a pre-shared key (PSK) to a VPN server, wherein the PSK is not available at the VPN client;
    receiving, by the VPN client, a response that includes the PSK; and
    in response to receiving the response that includes the PSK:
        decrypting, by the VPN client, the response based on the short-term key pair to obtain a ciphertext;
        decrypting, by the VPN client, the ciphertext based on the short-term high security key pair to obtain the PSK; and
        establishing a VPN tunnel between the VPN client and the VPN server based on the PSK, wherein establishing the VPN tunnel comprises:
            transmitting, by the VPN client to the VPN server, a request to establish the VPN tunnel; and
            receiving, by the VPN client and from the VPN server, a response indicating that the VPN client is authorized to establish the VPN tunnel.

2. The method of claim 1, wherein the short-term key pair includes a short-term public key and a short-term private key, wherein the short-term high security key pair includes a short-term high security public key and a short-term high security private key, and wherein the request includes the short-term public key and the short-term high security public key.

3. The method of claim 2, wherein the ciphertext is generated using the short-term high security public key.

4. The method of claim 1, wherein in response to the request to establish the VPN tunnel, the VPN server authenticates and authorizes the VPN client.

5. The method of claim 4, wherein the short-term high security key pair is generated using a Kyber algorithm.

6. The method of claim 1, further comprising:
    transmitting, by the VPN client and during a handshake operation, a long-term public key associated with the VPN client that is used to authenticate the VPN client.

7. The method of claim 1, wherein the short-term key pair is generated using elliptic-curve cryptography.

8. A virtual private network client (a VPN client), comprising:
    a memory; and
    a processor, the processor configured to execute instructions stored in the memory to:
        generate a short-term key pair;
        generate a short-term high security key pair, wherein the short-term high security key pair is quantum-resistant;
        transmit a request for a pre-shared key (PSK) to a VPN server, wherein the PSK is not available at the VPN client;
        receive a response that includes the PSK; and
        in response to receiving the response that includes the PSK:
            decrypt the response based on the short-term key pair to obtain a ciphertext;
            decrypt the ciphertext based on the short-term high security key pair to obtain the PSK; and
            establish a VPN tunnel with the VPN server based on the PSK, wherein to establish the VPN tunnel comprises to:
                transmit, to the VPN server, a request to establish the VPN tunnel; and
                receive, from the VPN server, a response indicating that the VPN client is authorized to establish the VPN tunnel.

9. The VPN client of claim 8, wherein the short-term key pair includes a short-term public key and a short-term private key, wherein the short-term high security key pair includes a short-term high security public key and a short-term high security private key, and wherein the request includes the short-term public key and the short-term high security public key.

10. The VPN client of claim 9, wherein the ciphertext is generated using the short-term high security public key.

11. The VPN client of claim 8, wherein in response to the request to establish the VPN tunnel, the VPN server authenticates and authorizes the VPN client.

12. The VPN client of claim 11, wherein the short-term high security key pair is generated using a Kyber algorithm.

13. The VPN client of claim 8, further the processor is further configured to executed instructions stored in the memory to:
    transmit, during a handshake operation, a long-term public key associated with the VPN client and that is used to authenticate the VPN client.

14. The VPN client of claim 8, wherein the short-term key pair is generated using elliptic-curve cryptography.

15. A non-transitory computer readable medium storing instructions operable to cause one or more processors to perform operations comprising:

generating, by a virtual private network (VPN) client, a short-term key pair that includes a short-term public key and a short-term private key;

generating, by the VPN client, a short-term high security key pair that includes a short-term high security public key and a short-term high security private key, wherein the short-term high security key pair is quantum-resistant;

transmitting, by the VPN client, a request for a pre-shared key (PSK) to a VPN server, wherein the PSK is not available at the VPN client;

receiving, by the VPN client, a response that includes the PSK; and in response to receiving the response that includes the PSK:
    decrypting, by the VPN client, the response using the short-term private key to obtain a ciphertext;
    decrypting, by the VPN client, the ciphertext using the short-term high security private key to obtain the PSK; and
    establishing a VPN tunnel between the VPN client and the VPN server based on the PSK, wherein establishing the VPN tunnel comprises:
        transmitting, by the VPN client to the VPN server, a request to establish the VPN tunnel; and
        receiving, by the VPN client and from the VPN server, a response indicating that the VPN client is authorized to establish the VPN tunnel.

16. The non-transitory computer readable medium of claim 15, wherein the request includes the short-term public key and the short-term high security public key.

17. The non-transitory computer readable medium of claim 16, wherein the ciphertext is generated using the short-term high security public key.

18. The non-transitory computer readable medium of claim 15, wherein in response to the request to establish the VPN tunnel, the VPN server authenticates and authorizes the VPN client.

19. The non-transitory computer readable medium of claim 18, wherein the short-term high security key pair is generated using a Kyber algorithm.

20. The non-transitory computer readable medium of claim 15, wherein the short-term key pair is generated using elliptic-curve cryptography.

* * * * *